US012500364B2

(12) United States Patent
Patil et al.

(10) Patent No.: US 12,500,364 B2
(45) Date of Patent: Dec. 16, 2025

(54) ANTI-WEAR FEMALE RECEPTACLE TERMINAL

(71) Applicant: Molex, LLC, Lisle, IL (US)

(72) Inventors: Deepak Patil, Rochester Hills, MI (US); Yves Lepottier, Ann Arbor, MI (US)

(73) Assignee: Molex, LLC, Lisle, IL (US)

( * ) Notice: Subject to any disclaimer, the term of this patent is extended or adjusted under 35 U.S.C. 154(b) by 266 days.

(21) Appl. No.: 18/026,351

(22) PCT Filed: Sep. 20, 2021

(86) PCT No.: PCT/IB2021/058559

§ 371 (c)(1),
(2) Date: Mar. 15, 2023

(87) PCT Pub. No.: WO2022/058979

PCT Pub. Date: Mar. 24, 2022

(65) Prior Publication Data

US 2023/0378676 A1 Nov. 23, 2023

Related U.S. Application Data

(60) Provisional application No. 63/081,076, filed on Sep. 21, 2020.

(51) Int. Cl.

| | |
|---|---|
| ***H01R 13/187*** | (2006.01) |
| ***H01R 13/03*** | (2006.01) |
| ***H01R 43/26*** | (2006.01) |

(52) U.S. Cl.

CPC ........... *H01R 13/187* (2013.01); *H01R 13/03* (2013.01); *H01R 43/26* (2013.01)

(58) Field of Classification Search

CPC .... H01R 13/187; H01R 13/052; H01R 13/03; H01R 43/26

(Continued)

(56) References Cited

U.S. PATENT DOCUMENTS 4,699,444 A * 10/1987 Isohata ................ H01R 13/113 439/852
5,630,738 A * 5/1997 Ito ........................ H01R 13/113 439/852

(Continued)

FOREIGN PATENT DOCUMENTS

CN 209948137 U 1/2020
EP 3208888 B1 7/2019

(Continued)

OTHER PUBLICATIONS

International Preliminary Report on Patentability received for PCT Application No. PCT/IB2021/058559, mailed on Mar. 30, 2023, 8 pages.

(Continued)

*Primary Examiner* — Gary F Paumen

(57) ABSTRACT

A female receptacle terminal (10) for an electrical connector is disclosed. The female receptacle terminal includes a receptacle having an opening (20) to receive a male blade terminal (300) in an insertion direction (M). A resilient contact beam (100) extends from a top part of the receptacle towards an opposed bottom part. At least one contact surface (103, 113) is provided on at least one of the resilient contact beam and the bottom part and has a contact bump (105, 115) curved in the insertion direction and a width direction to engage the male blade terminal at a linear contact interface, and a guide portion (101, 111) being linear in the width direction and parallel to the bottom part in a plane perpendicular to the width direction to engage the male blade terminal at a point contact interface. Also disclosed is a male blade terminal, an electrical connector and a method of forming an electrical connection.

34 Claims, 8 Drawing Sheets

(58) Field of Classification Search
USPC ................ 439/816, 851, 852, 843, 886, 887
See application file for complete search history.

(56) References Cited

U.S. PATENT DOCUMENTS

| | | | | |
|---|---|---|---|---|
| 5,735,717 | A * | 4/1998 | Nabeshima .......... | H01R 13/113 439/851 |
| 6,206,738 | B1 * | 3/2001 | Sugie ................... | H01R 13/057 439/852 |
| 6,379,199 | B1 * | 4/2002 | Chen ...................... | H01R 13/11 439/852 |
| 7,090,545 | B2 * | 8/2006 | Morikawa ............ | H01R 13/193 439/852 |
| 7,470,159 | B2 * | 12/2008 | Hara .................... | H01R 13/113 439/852 |
| 8,323,061 | B2 * | 12/2012 | Hori ..................... | H01R 13/114 439/852 |
| 9,011,186 | B2 * | 4/2015 | Wirth ..................... | H01R 13/11 439/852 |
| 2001/0002350 | A1 * | 5/2001 | Kashiyama ............ | H01R 13/11 439/852 |
| 2003/0190847 | A1 * | 10/2003 | Nankou ............... | H01R 13/113 439/852 |
| 2012/0003881 | A1 | 1/2012 | Hora | |
| 2016/0254608 | A1 * | 9/2016 | Takahashi ................ | C25D 3/38 439/886 |
| 2017/0047677 | A1 | 2/2017 | Bhagyanathan Sathianathan | |
| 2018/0083380 | A1 * | 3/2018 | Goto ...................... | H01R 4/185 |
| 2018/0090854 | A1 * | 3/2018 | Lewis .................. | H01R 13/187 |

FOREIGN PATENT DOCUMENTS

| | | | |
|---|---|---|---|
| JP | H07192795 | A | 7/1995 |
| JP | 2000323217 | A | 11/2000 |
| JP | 2004311085 | A | 11/2004 |
| JP | 2006210188 | A | 8/2006 |
| JP | 2013168362 | A | 8/2013 |
| JP | 2019504458 | A | 2/2019 |

OTHER PUBLICATIONS

International Search Report and Written Opinion received for PCT Application No. PCT/IB2021/058559, mailed on Dec. 21, 2021, 10 pages.

* cited by examiner

ANTI-WEAR FEMALE RECEPTACLE TERMINAL

RELATED APPLICATIONS

This application is a U.S. National Phase of International Patent Application No. PCT/IB2021/058559, filed on Sep. 20, 2021, which claims priority to U.S. Provisional Patent Application No. 63/081,076, filed Sep. 21, 2020, which are incorporated herein by reference in their entireties.

TECHNICAL FIELD

The invention relates to the field of female receptacle terminals, particularly to anti-wear female receptacle terminals used in electrical connectors.

BACKGROUND OF THE INVENTION

Currently, electrical connectors transmit power and signal through a contact interface typically comprising a female receptacle terminal and a male blade terminal. The terminals are made of a conductive base material such as a copper-based alloy. The base material has a plating layer deposited over at least the contacting portions of the terminal system. Plating materials include and are not limited to gold, silver, tin and nickel. In these terminal systems during mating and un-mating, the plating material has a tendency to wear away or get ploughed. This degradation increases insertion force and electrical resistance.

There exists a need for an improved terminal system having increased wear resistance.

SUMMARY OF THE INVENTION

An important factor to control in the design of an electrical terminal is the force required to mate the female receptacle terminal with a male blade terminal. This is especially important in connector arrangements comprising multiple female receptacle terminals configured to mate simultaneously with a corresponding number of male blade terminals, since the overall insertion force will be a multiple of the single insertion force required for a single set of male and female terminals. Another important factor is the repeatability of the insertion force over a number of mates and unmates, i.e. over a number of connection and disconnection cycles. In known electrical connectors, the inventors have identified that a significant amount of wear takes place when the male blade terminal is inserted into the female receptacle terminal. As this wear worsens over the use of the electrical connectors, the insertion force can become greater and/or less predictable over time. The inventors have devised a solution to this problem as outlined below.

According to an embodiment, there is provided a female receptacle terminal for an electrical connector, the female receptacle terminal comprising any or all of the following features: a receptacle with an insertion axis and an opening configured to receive a male blade terminal into the receptacle in an insertion direction along the insertion axis; a resilient contact beam extending from a top part of the receptacle towards an opposed bottom part of the receptacle; and at least one contact surface configured to engage with the male blade terminal during insertion of the male blade terminal into the receptacle, the at least one contact surface being provided on at least one of the resilient contact beam and the bottom part and comprising: a contact bump projecting into the receptacle in a transverse direction and having an outer shape which is curved both in the insertion direction and in a width direction of the receptacle; and a guide portion projecting into the receptacle in the transverse direction and having an outer shape which is linear in the width direction and parallel to the bottom part in a plane perpendicular to the insertion direction, the guide portion being positioned adjacent to the contact bump and closer to the opening than the contact bump such that, during insertion of a male blade terminal into the receptacle, the guide portion engages the male blade terminal before the contact bump.

By providing a contact surface having the above arrangement, a male blade terminal being inserted into the receptacle will first encounter the guide portion before moving towards its fully inserted position and encountering the contact bump. By arranging the guide portion to have an outer shape which is linear in the width direction and parallel to the bottom part in a plane perpendicular to the insertion direction, the guide portion can provide a line contact at an interface between the contact surface and the male blade terminal. This distributes the force across a significant proportion of the width of the male blade terminal. By arranging the contact bump to have an outer shape which is curved both in the insertion direction and in the width direction of the receptacle, a point contact interface is provided between the contact surface and the male blade terminal. In this way, as the male blade terminal is being inserted into the receptacle, it will engage the guide portion along a linear contact interface before engaging the contact bump at a point contact interface. The inventors have identified that this provides an advantageous distribution of pressure across the male blade terminal while reducing significant wear formations during mating, while still providing a good electrical connection via the contact bump once the male blade terminal has been fully inserted. Overall, this arrangement reduces the insertion force and reduces or eliminates wear of the terminal contact surfaces, thereby providing easy to assembly and more robust electrical connectors.

The at least one contact surface may comprise a top contact surface on the resilient contact beam. In such embodiments, the contact bump and the guide portion of the contact surface both project into the receptacle in a downward transverse direction, i.e. towards the bottom part of the receptacle. The resilient contact beam may extend along the insertion axis. The resilient contact beam may have a straight primary shape. The resilient contact beam may have a primary shape comprising a front portion which may extend towards the bottom part in the insertion direction. In such embodiments, the front portion flares outwards towards the opening to ease insertion of the male blade terminal. The resilient contact beam may further comprise a rear portion which may extend away from the bottom part in the insertion direction. The resilient contact beam may further comprise a beam apex which may be located between the front and rear portions. This may provide an advantageous arrangement in which the guide portion is provided by a bend in the resilient contact beam. Alternatively or in addition, the guide portion may be provided by an additional surface feature on the resilient contact beam.

The contact beam may have a bump apex which is rearward of the beam apex in the insertion direction. The bump apex may be located at least 0.05 mm rearward of the beam apex. The bump apex may be located preferably at least 0.1 mm rearward of the beam apex. For example, the bump apex may be at least 0.1 mm, at least 0.15 mm, at least 0.2 mm, at least 0.25 mm, at least 0.3 mm, or at least 0.35 mm rearward of the beam apex in the insertion direction. Such an offset can provide an advantageous distance over which the transition between the line contact provided by the guide portion and the point contact provided by the contact bump is realised. The beam apex may define a leading edge of the guide portion. The beam apex may have a part-cylindrical outer surface shape. The radius of curvature of the part-cylindrical outer surface shape may be from 0.2 mm to 2 mm, preferably from 0.2 mm to 1.2 mm.

The at least one contact surface may comprise a bottom contact surface on the bottom part. The guide portion may comprise a ramp. The ramp may have a front end which may be adjacent to the bottom part. The ramp may have a rear end which may be adjacent to a bump apex of the contact bump. By providing the guide portion as a ramp, the contact interface between the male blade terminal and the contact surface can transition gradually from a line contact at the front end of the ramp towards a point contact at the bump apex. The provision of a ramp may also allow the contact surface of the bottom part to be formed by a convenient manufacturing process such as by stamping.

An upper surface of the ramp may define a ramp angle in the insertion direction from the front end to the rear end which is substantially constant. The upper surface of the ramp may linearly increase in height from the front end to the rear end. The upper surface of the ramp may have a first width at the front end and may have a second width at the rear end. The first width may be greater than the second width. This may allow the contact interface between the male blade terminal and the bottom contact surface to transition gradually from a line contact at the front end of the ramp to a narrower line contact at the rear end of the ramp and thereby ease the transition to the point contact at the bump apex. The upper surface of the ramp may be tapered linearly from the first width to the second width. The first width may extend across at least 40% of a width of the bottom part, preferably at least 50% of the width of the bottom part. The ramp angle may be any suitable angle. In certain embodiments, the ramp angle is no greater than 20 degrees from the insertion axis.

The guide portion may be spaced from the contact bump. The guide portion may be contiguous with the contact bump. The guide portion may intersect a front region of the contact bump. The guide portion may intersect the front region at an intersection boundary at which the contact bump has a first gradient in the insertion direction and the guide portion has a second gradient in the insertion direction. The first and second gradients may be substantially the same. In other words, the guide portion may extend from the contact bump at a tangent to the contact bump at the intersection boundary. This may provide a smooth transition between the guide portion and the contact bump. The outer shape of the contact bump may be part-spherical.

The at least one contact surface may comprise a single contact surface in the form of a bottom contact surface provided on the bottom part, in accordance with any of the embodiments discussed above. The at least one contact surface may comprise a single contact surface in the form of a top contact surface provided on the resilient contact beam, in accordance with any of the embodiments discussed above. In certain arrangements, the at least one contact surface comprises both a bottom contact surface provided on the bottom part in accordance with any of the embodiments discussed above and a top contact surface provided on the resilient contact beam in accordance with any of the embodiments discussed above.

The female receptacle terminal may comprise a body having a connection section. The connection section may be configured for coupling to a conductor. The body may further comprise a contacting section which may be configured for providing an electrical connection to a mating male blade terminal. The contacting section may comprise the resilient contact beam. The female receptacle terminal may further comprise a covering. The contacting section of the body may be received within the covering to define the receptacle of the female receptacle terminal. In other embodiments, the female receptacle terminal may comprise a single unitary structure.

The contacting section of the body may further comprise a stationary beam. The stationary or fixed beam may extend in the insertion direction and may oppose the resilient contact beam. The stationary or fixed beam may define at least part of the bottom part of the receptacle. The contact surface on the bottom part may be provided on the stationary beam.

The bottom part of the receptacle may be defined at least in part by a bottom wall of the receptacle. Where the female receptacle terminal comprises a covering, the bottom wall of the receptacle may be defined by a bottom wall of the covering. The bottom contact surface may be provided on the bottom wall.

The top part of the receptacle may be defined at least in part by a top wall of the receptacle. Where the female receptacle terminal comprises a covering, the top wall of the receptacle may be defined by a top wall of the covering. The covering may further comprise a stiffening beam formed in the top wall. The stiffening beam may be cantilevered from a point on the top wall and bent downwards towards the resilient contact beam. The stiffening beam may be configured to provide increased resistance to upward deflection of the resilient contact beam during mating. The stiffening beam may be configured to provide increased normal force provided by the resilient contact beam to provide superior electrical connection. The covering may further comprise a support beam formed in the top wall and located immediately above the stiffening beam. The support beam may be cantilevered from a point on the top wall and bent downwards towards the resilient contact beam. The support beam may be configured to further increase resistance to upward deflection of the resilient contact beam during mating. The support beam may be configured to further increase normal force provided by the resilient contact beam to provide superior electrical connection.

The at least one contact surface may comprise a conductive base material and may comprise a plating layer deposited over the conductive base material. The plating layer may be formed from any suitable material. For example, the plating layer may be a tin plating layer, a silver plating layer, or a gold plating layer.

The plating layer may have any suitable thickness. In some arrangements, the plating layer is a tin plating layer having a thickness of from 2.5 microns to 4.0 microns.

The conductive base material may be formed from any suitable electrically conductive material. The conductive base material may comprise copper. The conductive base material may comprise or consist solely of a copper alloy. The at least one contact surface may comprise an intermediate layer between the conductive base material and the plating layer. The intermediate layer may be formed from any suitable material. The intermediate layer may comprise nickel. In some arrangements, the intermediate layer may consist solely of nickel or a nickel alloy.

According to another embodiment, there is provided a female receptacle terminal for an electrical connector, the female receptacle terminal comprising any or all of the following features: a receptacle with an insertion axis and an opening configured to receive a male blade terminal into the receptacle in an insertion direction along the insertion axis; a resilient contact beam extending from a top part of the receptacle towards an opposed bottom part of the receptacle; and at least one contact surface configured to engage with the male blade terminal during insertion of the male blade terminal into the receptacle, the at least one contact surface being provided on at least one of the resilient contact beam and the bottom part and comprising: a guide portion projecting into the receptacle in a transverse direction and configured to engage the male blade terminal along a linear contact interface during insertion of the male blade terminal; and a contact bump projecting into the receptacle in the transverse direction and configured to engage the male blade terminal at a point contact interface when the male blade terminal is mated with the female receptacle terminal.

The guide portion may be positioned closer to the opening than the contact bump. In this way, during insertion of the male blade terminal into the receptacle, the guide portion may engage the male blade terminal before the contact bump. This may allow the contact surface to engage the male blade terminal at a linear contact interface before engaging the male blade terminal at a point contact interface.

According to another embodiment, there is provided a female receptacle terminal for an electrical connector, the female receptacle terminal comprising any or all of the following features: a receptacle with an insertion axis and an opening configured to receive a male blade terminal having a predefined tip shape into the receptacle in an insertion direction along the insertion axis; a resilient contact beam extending from a top part of the receptacle towards an opposed bottom part of the receptacle and having a contact bump projecting into the receptacle, and at least one contact surface configured to engage with the male blade terminal during insertion of the male blade terminal into the receptacle, wherein the resilient contact beam is configured such that during insertion of the male blade terminal into the receptacle, the contact bump engages the predefined tip shape at an initial contact interface having an angle of no greater than 20 degrees to the insertion axis.

In certain embodiments, the angle at the contact interface, or the "attack angle", is no greater than 16 degrees to the insertion axis. In certain embodiments, the angle is no greater than 10 degrees to the insertion axis. For a given normal force acting on the male blade terminal from the at least one contact surface, the attack angle can be optimised so as to reduce or eliminate wear depending on the specific application of the electrical connector.

According to another embodiment, there is provided a female receptacle terminal for an electrical connector, the female receptacle terminal comprising any or all of the following features: a receptacle with an insertion axis and an opening configured to receive a male blade terminal into the receptacle in an insertion direction along the insertion axis; a resilient contact beam extending from a top part of the receptacle towards an opposed bottom part of the receptacle; and at least one contact surface configured to engage with the male blade terminal during insertion of the male blade terminal into the receptacle, the at least one contact surface being provided on at least one of the resilient contact beam and the bottom part and being configured to reduce wear of the male blade terminal during insertion.

The receptacle may be configured to receive a male blade terminal with a predefined tip shape. The at least one contact surface may be configured to engage the predefined tip shape. The predefined tip shape may have a flat upper and/or flat lower contact surface. The surfaces of the predefined tip shape may be flat in the sense that they have no curvature along the width of the male blade terminal, i.e., they have no curvature in a direction perpendicular to a longitudinal axis of the male blade terminal. The predefined tip shape may be tapered along a length of no greater than 1.5 mm. In certain embodiments, the predefined tip shape may be tapered along a length of no greater than 1.2 mm. As used herein, the term "tapered" means that the thickness of the male blade terminal gradually reduces in the height direction towards its nose or tip end. The distance over which the taper extends is defined as the dimension in the insertion direction from the extreme tip end to the point at which the thickness of the male blade terminal no longer reduces. This may be a point at which both the upper and lower contact surfaces of the male blade terminal are flat.

Also disclosed herein is a male blade terminal for an electrical connector, the male blade terminal comprising any or all of the following features: a conductive base material; a tin plating layer having a thickness of from 2.5 microns to 7 microns, preferably from 5 microns to 7 microns, and an intermediate layer between the conductive base material and the tin plating layer.

The male blade terminal may comprise a predefined tip shape as described above. The predefined tip shape may have a flat upper and/or flat lower contact surface. The surfaces of the predefined tip shape may be flat in the sense that they have no curvature along the width of the male blade terminal. The predefined tip shape may be tapered along a length of no greater than 1.5 mm. In certain embodiments, the predefined tip shape may be tapered along a length of no greater than 1.2 mm.

The conductive base material may be formed from any suitable electrically conductive material. The conductive base material may comprise copper. The conductive base material may be a copper alloy. The intermediate layer may comprise nickel. The intermediate layer may be formed from nickel or a nickel alloy. The intermediate layer may have a thickness of from 1.0 microns to 1.8 microns.

According to a further embodiment, there is provided an electrical connector comprising a female receptacle terminal in accordance with any of the embodiments discussed above, and a male blade terminal configured to be received in the receptacle.

According to another embodiment, there is provided a method of forming an electrical connection comprising any or all of the following steps: providing a female receptacle terminal, the female receptacle terminal comprising: a receptacle with an insertion axis and an opening configured to receive a male blade terminal into the receptacle in an insertion direction along the insertion axis; a resilient contact beam extending from a top part of the receptacle towards an opposed bottom part of the receptacle; and at least one contact surface configured to engage with the male blade terminal during insertion of the male blade terminal into the receptacle, the at least one contact surface being provided on at least one of the resilient contact beam and the bottom part; and inserting the male blade terminal into the receptacle, wherein the step of inserting is carried out by engaging the male blade terminal with the at least contact surface along a linear contact interface and subsequently engaging the male blade terminal with the at least one contact surface at a point contact interface.

BRIEF DESCRIPTION OF THE DRAWINGS

Further features and advantages of the present invention will become apparent from the following description of embodiments thereof, presented by way of example only, and by reference to the drawings, in which.

DETAILED DESCRIPTION

As required, detailed embodiments of the disclosure are presented herein; however, and it is to be understood that the disclosed embodiments are merely exemplary of the disclosure, which may be embodied in various forms. Therefore, specific details disclosed herein are not to be interpreted as limiting, but merely as a basis for the claims and as a representative basis for teaching one skilled in the art to variously employ the disclosure.

Figure 1:
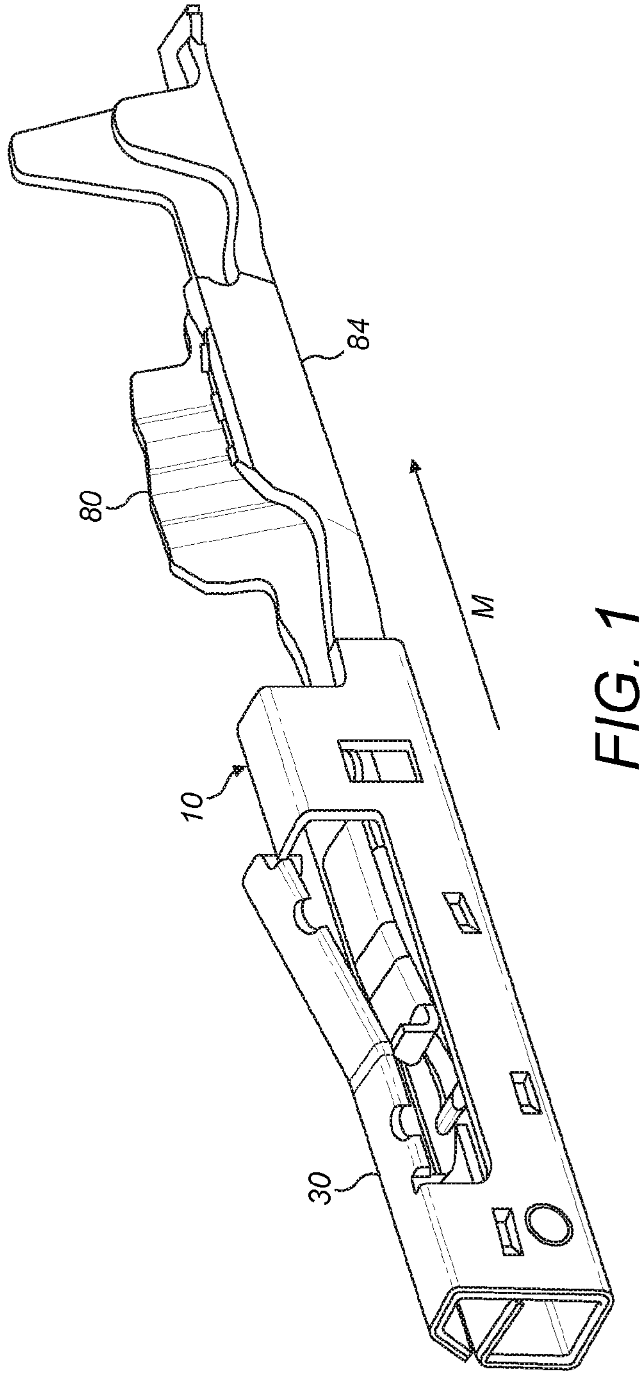
FIG. 1 is a perspective view of the female receptacle terminal according to the disclosure.
Figure 2:
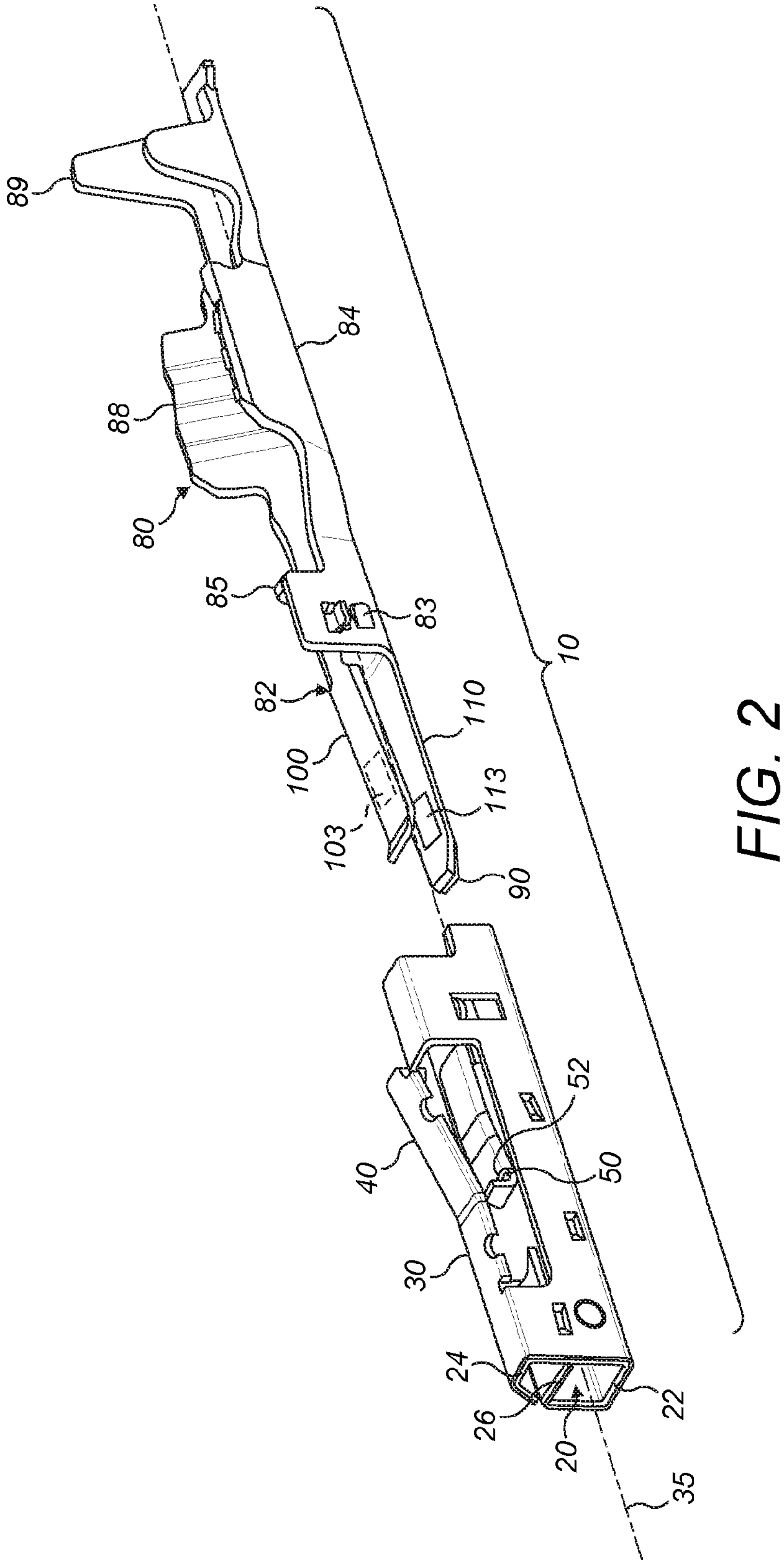
FIG. 2 is an exploded view of the terminal according to FIG. 1.

FIGS. 1 and 2 illustrate a female receptacle terminal 10. The female receptacle terminal 10 comprises a receptacle with an insertion axis 35 and an opening 20. The opening 20 is configured to receive a male blade terminal (not shown) into the receptacle in a mating or insertion direction M along the insertion axis 35. In the arrangement shown, the terminal 10 comprises: a body 80 having a connection section 84 at an end portion of the terminal 10 for being coupled to a conductor; a contacting section 82 for providing an electrical connection to the male blade terminal; and a covering 30 which encloses the contacting section 82 of the body 80. The covering 30 provides retention and reinforcement of the body 80 when the body 80 is inserted therein. While these components are illustrated as being separable, it will be understood that the body 80 and the covering 30 may instead be formed as a single integral component to provide the terminal 10.

The body 80 is formed in a longitudinal direction along the axis 35. The termination of the connection section 84 is generally positioned at the rear or first end of the body 80 and the contacting section 82 is disposed at the front or second end of the body 80. The body 80 may be stamped and formed from a single piece of an electrically conductive material such as copper or any other copper-based alloy or similar material having comparable electrical conducting properties. In the illustrated arrangement, the connection section 84 is "U" shaped and comprises a first pair of wings 88 disposed adjacent the contacting section 82 and a second pair of wing portions 89 positioned adjacent the first pair of wings 88. The first pair of wings 88 can be used to secure a bare conductor portion of a cable (not shown) and the second pair of wings 89 can be used to secure an insulated portion of the cable.

The covering 30 may be stamped and formed from a flat plate and may include a periphery that is generally rectangular. The periphery may include a lower section 22 and a pair of side walls, extending from the lower section 22, and an upper section 24. In the arrangement of FIG. 2, the covering 30 includes a middle wall 26 that defines the upper section 24 and lower section 22. An opening 20 for receiving the mating male terminal can be provided at one end of the lower section 22. In the arrangement shown, both the lower section 22 and the upper section 24 extend along the insertion axis 35 and along the length of the covering 30.

The female receptacle terminal 10 comprises a resilient contact beam 100 extending from a top part of the receptacle towards a bottom part of the receptacle. In the illustrated arrangement, the top part is provided by the upper section 24 and the bottom part is provided by the lower section 22. As best shown in FIG. 2, the resilient contact beam 100 may extend from the body 80 and be configured to be slidably received by the covering 30 when the connecting section 82 of the body 80 is inserted therein.

At least one contact surface is provided to engage with the male blade terminal during insertion thereof into the receptacle. In the arrangement shown, a contact surface 103 is provided on the resilient contact beam 100. In particular, the contact surface is disposed on an underside of the resilient contact beam 100 so as to face a bottom part of the receptacle.

Another contact surface may instead, or additionally, be provided on the bottom part of the receptacle. In the arrangement shown, a contact surface 113 is provided on a topside of the bottom part of the receptacle, more particularly on a stationary or fixed beam 110 of the female receptacle terminal 10. The stationary beam 110 may extend from the body 80 and be configured to be slidably received by the covering 30 when the connecting section 82 of the body 80 is inserted therein. In this way, contact surfaces 103, 113 may be provided at one or both sides of the receptacle in order to engage a male blade terminal 300 received by the receptacle.

As shown in FIG. 2, the contact beam 100 and the stationary beam 110 extend along the insertion axis 35 and are formed from a base 83. From the base 83, the stationary beam 110 extends forward along the insertion axis 35 in a flat manner and the resilient contact beam 100 extends from a top portion of the base and opposes the stationary beam 110. A side wall of the base 83 extends above the resilient contact beam 100 and includes a stop edge 85. The stop edge 85 defines a surface that is normal to the insertion axis 35 in order to limit the extent to which the body 80 can be inserted into the covering 30 along the insertion axis 35.

As shown in FIG. 1, the body 80 may be slidably received by the covering 30 in the lower section 22 thereof at an opposite end to the opening 20. When inserted, the stationary beam 110 may be positioned on the lower section 22 of the covering 30.

A retention beam 40 may be formed in the covering 30. In the arrangement shown, the retention beam 40 extends in an outwardly direction and is bent and cantilevered from the upper section 24 of the covering 30. The covering 30 may also comprise a stiffening beam 50 formed from the middle wall 26 in order to provide an additional support to the resilient contact beam 100. The covering 30 may also comprise a support beam 52 stacked on top of the stiffening beam 50 in order to provide additional support to the resilient contact beam 100. This provides increased resistance to deflection during mating and increases the normal force. By using higher tensile strength material in the covering 30, the normal force can be further increased.

FIGS. 3 to 6 illustrate additional details of the resilient contact beam 100 and the stationary beam 110 according to an embodiment. In the illustrated arrangement, when the body 80 is inserted in the covering 30, the stationary beam 110 defines a bottom part of the receptacle adjacent the lower section 22 of the covering 30. Also, the resilient contact beam 100 extends along the receptacle in the insertion direction M and may have a primary shape comprising a front portion, a rear portion and a beam apex.

The front portion 100*a* extends towards the bottom part in the insertion direction M. In the arrangement shown, the front portion 100*a* is disposed at a free end of the cantilevered contact beam 100 and extends towards the stationary beam 100 in the insertion direction M. In other words, the resilient contact beam 100 has a front portion 100*a* that is sloped downwards, towards the stationary beam 110, with respect to the insertion direction M.

The rear portion 100*b* extends away from the bottom part of the receptacle in the insertion direction M. In the embodiment shown in FIG. 3, the rear portion 100*b* extends away from the stationary beam in the insertion direction M. In other words, the resilient contact beam 100 has a front portion 100*a* that is sloped upwards, away from the stationary beam 110, with respect to the insertion direction M.

Figure 3:
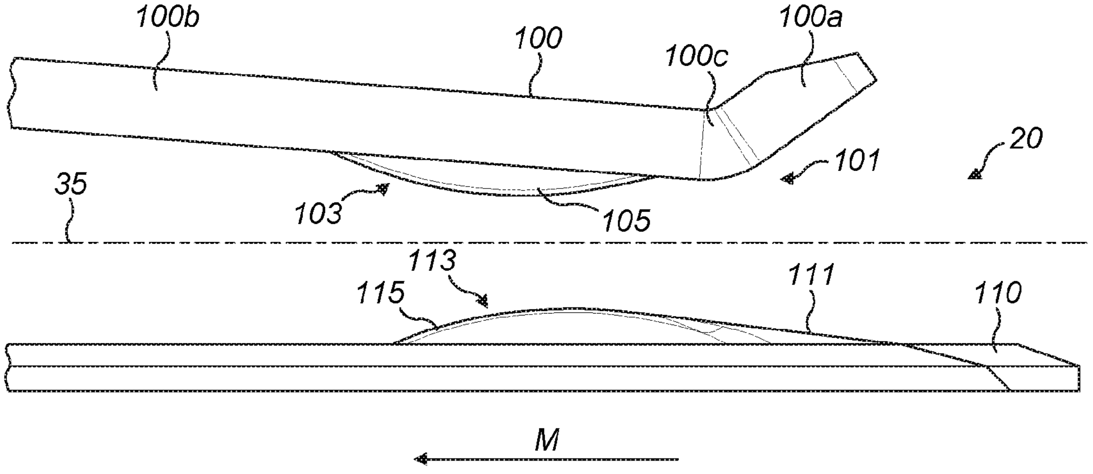
FIG. 3 is a partial sectional view of the terminal of FIG. 1.
Figure 4:
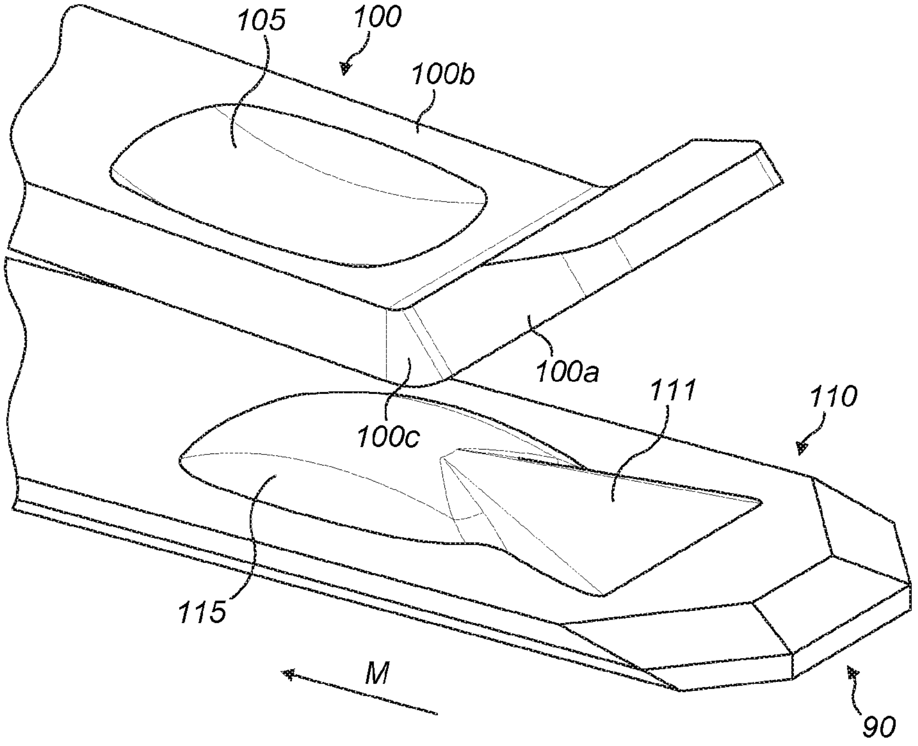
FIG. 4 is a perspective view of the terminal of FIG. 1.
Figure 5:
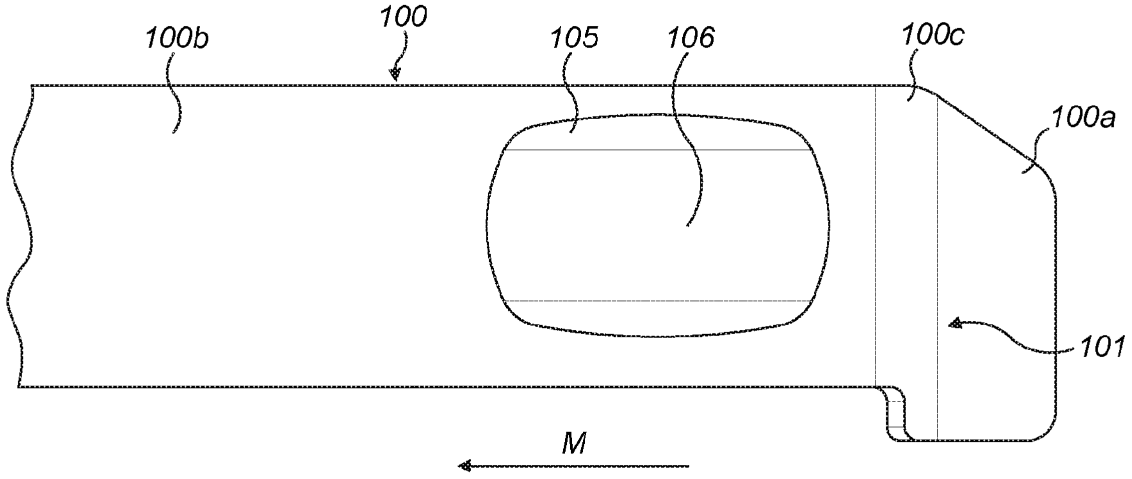
FIG. 5 is a bottom view of a contact beam of the terminal of FIG. 1.

The beam apex 100*c* connects the front portion 100*a* and rear portion 100*b*. As shown in FIGS. 3 to 5, the beam apex 100*c* can provide a smooth transition between the downward sloping front portion 100*a* and the upward sloping rear portion 100*b* of the contact beam 100. In this way, the resilient contact beam 100 may have a convex shape with respect to the bottom part of the receptacle.

In an equilibrium position of the resilient contact beam 100, i.e., when it is not being displaced by any male blade terminal, the front portion 100*a* may slope upwards from the beam apex 100*c* towards the opening 20 at any suitable angle with respect to the insertion axis 35, for example from 5 degrees to 70 degrees, and the rear portion may extend upwards from the beam apex 100*c* in the insertion direction M at any suitable angle, for example from 2 degrees to 30 degrees. In the illustrated arrangement, the front portion 100*a* extends at an angle of approximately 45 degrees to the insertion axis 35 and the rear portion 100*b* extends at an angle of approximately 10 degrees to the insertion axis 35. In the arrangement shown, the front portion 100*a* is closer to the opening 20 than the rear portion 100*b*.

The contact surface 103 of the resilient contact beam 100 comprises a contact bump 105. The contact bump 105 projects into the receptacle and has an outer shape which is curved both in the insertion direction M and in a width direction of the receptacle. That is to say, the contact bump is non-linear in both the insertion direction M and in the width direction, which is perpendicular to the insertion direction M and parallel to the plane of the bottom part of the receptacle. In the arrangement shown, the contact bump 105 has an at least part spherical surface. In other arrangements, the surface may be at least part ellipsoidal or ovoidal.

The contact bump 105 may have a bump apex 106 which is located rearward of the beam apex 100*c* in the insertion direction M. The bump apex 106 may be provided as the outermost point on the contact bump 105 with respect to the rear portion 100*b*. In other words, the bump apex 106 is the point on the surface of the contact bump 105 that is at a maximum perpendicular distance from the outer surface of the rear portion 100*a* of the resilient contact beam 100. The bump apex 106 may be located at least 0.25 mm rearward of the beam apex 100*c*. Preferably, the bump apex 106 is located at least 0.35 mm rearward of the beam apex 100*c*.

The contact surface 103 may also comprise a guide portion 101. In the arrangement shown, the guide portion 101 projects into the receptacle and has an outer shape which is linear in the width direction and parallel to the bottom part of the receptacle in a plane perpendicular to the insertion direction M. In other words, the guide portion 101 has no curvature in the width direction and is not tilted about the insertion axis 35.

The beam apex 100*c* may define a leading edge of the guide portion 101. In the arrangement shown, the beam apex 100*c* has a part-cylindrical outer surface shape. The radius of curvature of the part-cylindrical surface shape is preferably from 0.2 mm to 2 mm, more preferably from 0.2 mm to 1.2 mm. The guide portion 101 may be positioned closer to the opening 20 than the contact bump 105. In this way, during insertion of a male terminal blade into the receptacle via the opening 20, the guide portion 101 engages the male blade terminal before engaging the contact bump 105.

Figure 6:
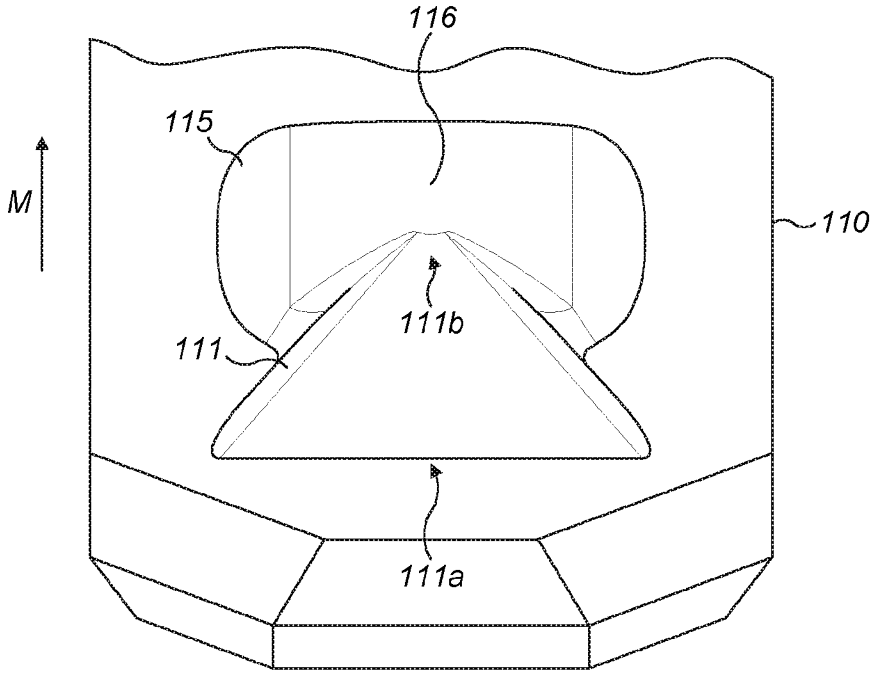
FIG. 6 is a top perspective view of a fixed beam of the terminal of FIG. 1.

As best shown in FIGS. 4 and 6, the contact surface 113 on the bottom part of the receptacle may be provided on the stationary beam 110. The contact surface 113 may comprise a contact bump 115 which projects into the receptacle and has an outer shape which is curved both in the insertion direction and in a width direction of the receptacle. That is to say, the contact bump is non-linear in both the insertion direction M and in the width direction, which is perpendicular to the insertion direction M and parallel to the plane of the bottom part of the receptacle. In the arrangement shown, the contact bump 115 has an at least part spherical surface. In other arrangements, the surface may be at least part ellipsoidal or ovoidal.

The contact bump 115 may have a bump apex 116. The bump apex 106 may be provided as the outermost point on the contact bump 115 with respect to the surface of the stationary beam 110. In other words, the bump apex 116 is the point on the surface of the contact bump 115 that is at a maximum perpendicular distance from the planar surface of the stationary beam 110.

The contact surface 113 may also comprise a guide portion 111. In the arrangement shown, the guide portion 111 projects into the receptacle and has an outer shape which is linear in the width direction and parallel to the bottom part of the receptacle in a plane perpendicular to the insertion direction M. In other words, the guide portion 111 has no curvature in the width direction and is not tilted about the insertion axis 35.

As best shown in FIG. 6, the guide portion 111 of the arrangement shown comprises a ramp having a front end 111*a* adjacent to the front end of the stationary beam 110 and a rear end 111*b* adjacent to the bump apex 116 of the contact bump 115. An upper surface of the ramp linearly increases in height from the front end 111*a* to the rear end 111*b*. The angle of the ramp with respect to the insertion direction is preferably less than 20 degrees and may be less than 15 degrees or less than 10 degrees. In the arrangement shown, the ramp angle is approximately 7 degrees. The upper surface of the ramp has a first width at the front end 111*a* and a second width at the rear end 111*b*, wherein the first width is greater than the second width. The first and second widths are measured in the width direction that is perpendicular to the insertion direction M. The upper surface of the ramp is tapered linearly from the first width to the second width. In the illustrated arrangement, the ramp has a substantially triangular upper surface. The first width may extend across at least 40% of a width of the bottom part, preferably at least 50%.

At least part of the guide portion 111 may overlap with the axial extent of the contact bump 115. In particular, a ramped portion of the guide portion 111 may overlap with the contact bump 115. In the arrangement shown, the rear end 111*b* of the guide portion 111 is located at a position at least 20% along the axial extent of the contact bump 115 in the insertion direction M. In other examples, the rear end 111*b* of the guide portion 111 may be located at a position at least 30 percent or at least 40 percent along the axial extent of the contact bump 115 in the insertion direction M. With reference to FIGS. 4 and 6, the upper surface of the guide portion 111 is tangential to the spherical surface of the contact bump 115. In other words, the gradient of the spherical surface at the point where the contact bump 115 meets the rear end 111*b* of the guide portion 111 may be the same as the gradient of the upper surface of the guide portion 111, in order to provide a smooth transition between the guide portion 111 and the contact bump 115.

In the vertical direction of FIG. 3 (perpendicular to the insertion axis 35), the minimum gap between the contact bump 105 on the resilient contact beam 100 and the contact bump 115 on the stationary beam 110 may be any suitable distance according to a number of factors including, but not limited to: the desired application of the connector, the size of the corresponding male blade terminal and/or the stiffness of the resilient contact beam 100. In some arrangements, the minimum gap between opposed contact bumps is in the region of 0.1 mm to 0.3 mm, for example 0.17 mm.

The bump apex 116 of the stationary beam 110 may be axially offset (i.e., offset in the direction of the insertion axis 35) from the bump apex 106 of the resilient contact beam 100 by any suitable distance according to the above-mentioned factors. The offset may be in the insertion direction or in the removal direction along the insertion axis 35. In the arrangement shown in FIG. 3, the apex of the contact bump 105 on the resilient contact beam 100 is offset in the insertion direction M (i.e., further from the opening 20) from the apex of the contact bump 115 on the stationary beam 110. In other arrangements, the apex of the contact bump 115 on the stationary beam 110 is offset in the insertion direction M from the apex of the contact bump 105 on the resilient contact beam 100. In some arrangement, the bump apexes 106, 116 may be offset by a distance of from 0 mm to 1 mm, for example from 0 mm to 0.5 mm. The offset may be approximately 0.2 mm. It will be understood that when the offset is 0 mm, the bump apexes are axially aligned.

A front end of the stationary beam 110, that is, the end closest to the opening 20, may have a chamfered edge 90. At least one of the contact surfaces 103, 113 of the female receptacle terminal 10 comprises a conductive base material and a plating layer deposited over the conductive base material. In one embodiment, the plating layer comprises tin, preferably having a thickness of from 2.5 microns to 4 microns. The plating layer is preferably formed by a matte plating process. The conductive base material may comprise copper or a copper alloy and a nickel intermediate layer may be formed between the conductive base material and the plating layer. The plating layer may preferably be coated in a lubricating layer.

Figure 7:
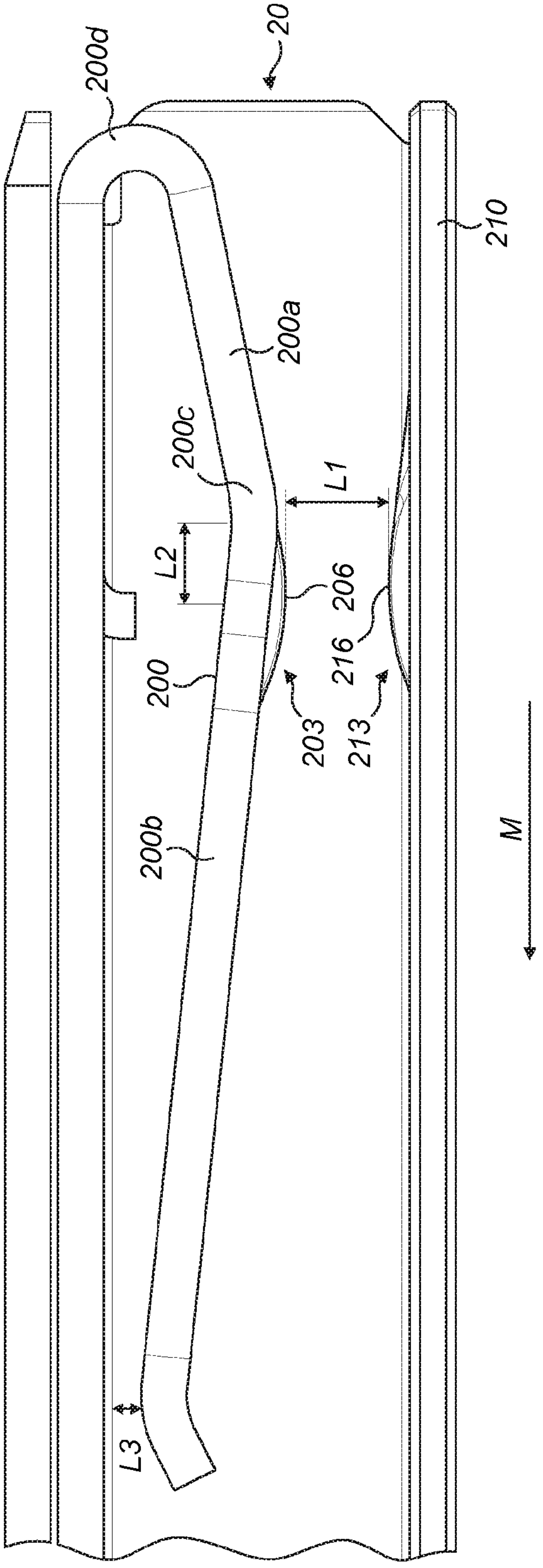
FIG. 7 is a sectional view of another according to the disclosure.
Figure 8:
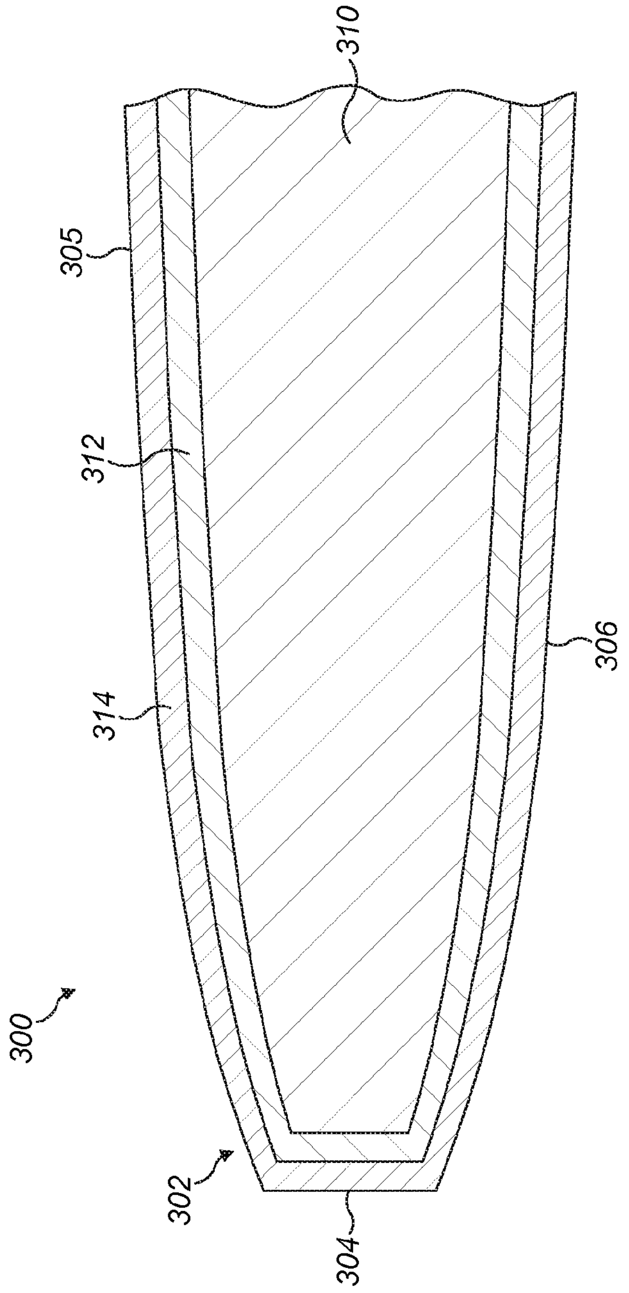
FIG. 8 is a sectional view of a male blade terminal according to the disclosure.

FIG. 7 illustrates an embodiment of a female receptacle terminal comprising a receptacle with an insertion axis and an opening 20 configured to receive a male blade terminal 300, see FIG. 8, into the receptacle in an insertion direction M along the insertion axis. The female receptacle terminal of FIG. 7 is similar in structure and operation to the embodiment of female receptacle terminal discussed above in relation to FIGS. 1 to 6 and similar reference numerals are used to denote similar features. Similarly to the embodiment shown in FIGS. 1 to 6, the receptacle comprises a resilient contact beam 200 extending from a top part of the receptacle towards an opposed bottom part of the receptacle. The bottom part may be defined by a fixed or stationary beam 210. In the arrangement shown, the resilient contact beam 200 comprises: a front portion 200*a* which extends towards a bottom part of the receptacle in an insertion direction M; a rear portion 200*b* which extends away from the bottom part in the insertion direction M; and a beam apex 200*c* located between the front and rear portions 200*a*, 200*b*. The terminal comprises at least one contact surface configured to engage with the male blade terminal 300 during insertion thereof into the receptacle. The at least one contact surface is provided on at least one of the resilient contact beam 200 and the bottom part. In the arrangement shown, a contact surface 203 is comprised on the resilient contact beam 200, and another contact surface 213 is comprised on the stationary beam 210. The description of the contact surfaces 103, 113 in relation to FIGS. 3 to 6 is applicable to this embodiment.

The main difference between this arrangement and that of FIGS. 1 to 6 is that in the arrangement of FIG. 7, the free end of the resilient contact beam 200 is disposed at the end of the rear portion 200*b*, at an opposite end of the resilient contact beam 200 to the front portion 200*a*. The resilient contact beam 200 is fixed to the top part of the receptacle by a mounting portion 200*d*. In the illustrated arrangement, the mounting portion 200*d* is connected to a front end of the front portion 200*a* in proximity to the opening 20.

FIG. 7 also illustrates several dimensions of the receptacle arrangement when it is in its equilibrium position, i.e., when there is no male blade terminal inserted into the receptacle. The height of a gap between the contact surface 203 on the resilient contact beam 200 and the contact surface 213 on the stationary beam 210 is denoted by the label L1. In particular, L1 is the height of the gap measured in a vertical direction (i.e., perpendicular to the insertion direction M) from an apex 206 of the contact bump on the contact surface 203 to an apex 216 of the contact bump on the opposing contact surface 213. The gap L1 may be any suitable distance according to the desired application. In some arrangements, L1 is from 0.35 mm to 0.50 mm, or from 0.40 mm to 0.45 mm. L1 may be approximately 0.43 mm. This dimension of L1 may apply equally to the embodiment of FIGS. 1 to 6.

In FIG. 7, the bump apex 206 is located rearward of the beam apex 200*c*. The distance in the insertion direction M from the beam apex 200*c* to the bump apex 206 is denoted by the label L2. Preferably, L2 is at least 0.25 mm, and more preferably L2 is at least 0.35 mm. That is, in some embodiments, the bump apex 206 may be located at least 0.25 mm rearward of the beam apex 200*c*, preferably at least 0.35 mm rearward of the beam apex 200*c*.

As shown in FIG. 7, the dimension L3 denotes a clearance in the vertical direction (i.e., perpendicular to the insertion direction M and the width direction) between the top part of the receptacle and an upper surface of the free end of the resilient contact beam 200. Preferably, L3 is from 0.06 mm to 0.25 mm, and more preferably L3 is approximately 0.18 mm. As will be described below, the dimension L3 is a factor determining the normal force exerted by the resilient contact beam 200 on a male blade terminal being inserted therein.

FIG. 8 schematically illustrates a cross-sectional view of a tip 302 of a male blade terminal 300 configured for connection with the female receptacle terminal 10. The tip 302 has a predefined tip shape which, in the arrangement shown, comprises a smooth converging portion having a truncated end face 304 at a distal end thereof. Proximally of the tip 302 is a portion of the male blade terminal 300 along which the outer surfaces of the male blade terminal are parallel to its longitudinal axis. It will be understood that upon insertion of the male blade terminal 300 into the female receptacle, the longitudinal axis of the male blade terminal 300 will be substantially parallel to the insertion axis. Therefore, the converging portion provides a taper along a length of the male blade terminal towards the end face 304 along which the thickness of the male blade terminal, i.e. the maximum dimension in the vertical direction, reduces. The predefined tip shape may be tapered along a length of less than 1.5 mm.

Outer contact surfaces of the tip 302 are configured to contact the contact surfaces 103, 113 of the female receptacle terminal. Although not shown in the figures, the male blade terminal 300 is preferably of the type having a rectangular or square cross section such that a top surface 305 is configured to contact the first contact surface 103 of the female receptacle terminal, and a bottom surface 306 opposite the first surface is configured to contact a second contact surface 113. The predefined tip shape may have a flat upper and/or flat lower contact surface. The surfaces of the predefined tip shape may be flat in the sense that they have no curvature along the width of the male blade terminal, i.e., they have no curvature in a direction perpendicular to the longitudinal axis of the male blade terminal and perpendicular to the height direction of the male blade terminal. Specifically, the upper and lower contact surfaces may be linear in the width direction and parallel to one another in a plane perpendicular to the longitudinal axis of the male blade terminal.

The steepest slope of the surfaces 305, 306 is made at the extremity of the male blade terminal 300 shown in FIG. 8, that is, at the point where the surfaces 305, 306 meet the end face 304. At the extremity, the top and bottom surfaces 305, 306 each form an angle with respect to the longitudinal axis of the male blade terminal 300. The angle is preferably less than 30 degrees or less than 25 degrees. In the illustrated arrangement, the angle is approximately 20 degrees. The gradient of the surfaces 305, 306 gradually decreases away from the end face 304 until they are parallel with the insertion axis 35, at which point the gradient of each surface 305 and 306 is zero.

In the illustrated arrangement, the male blade terminal 300 comprises a conductive base material 310, which may comprise copper or a copper alloy. A plating layer 314, preferably comprising tin, is provided on at least part of the outer surface of the tip 302. The male blade terminal 300 further includes an intermediate layer 312, preferably comprising nickel. The intermediate layer 312 is disposed between the conductive base material 310 and the plating layer 314. A lubricating layer may also be provided on the plating layer.

Figure 9A:
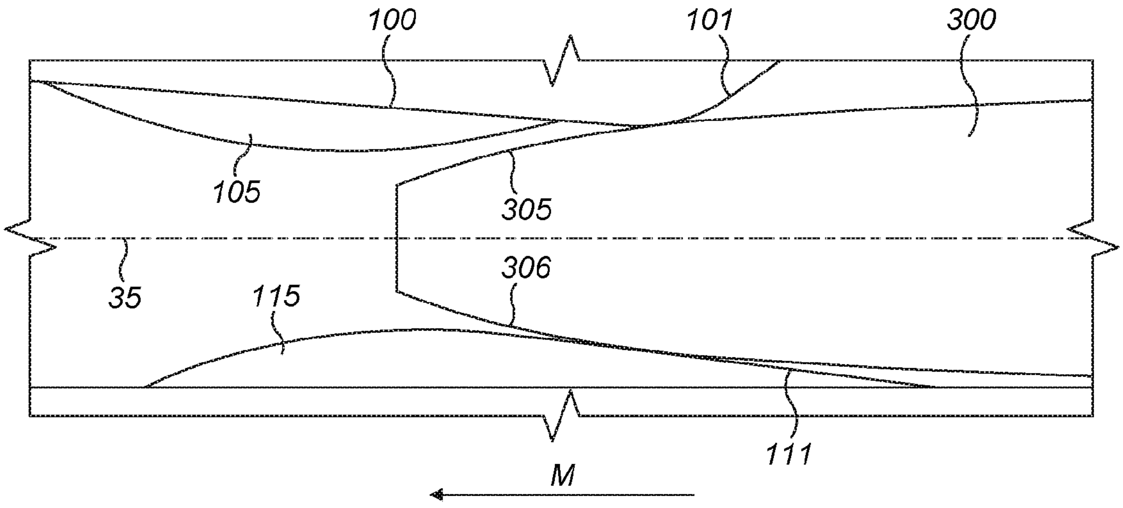
FIG. 9A is a schematic sectional view of a male blade terminal being inserted into a female receptacle terminal in a first position.
Figure 9B:
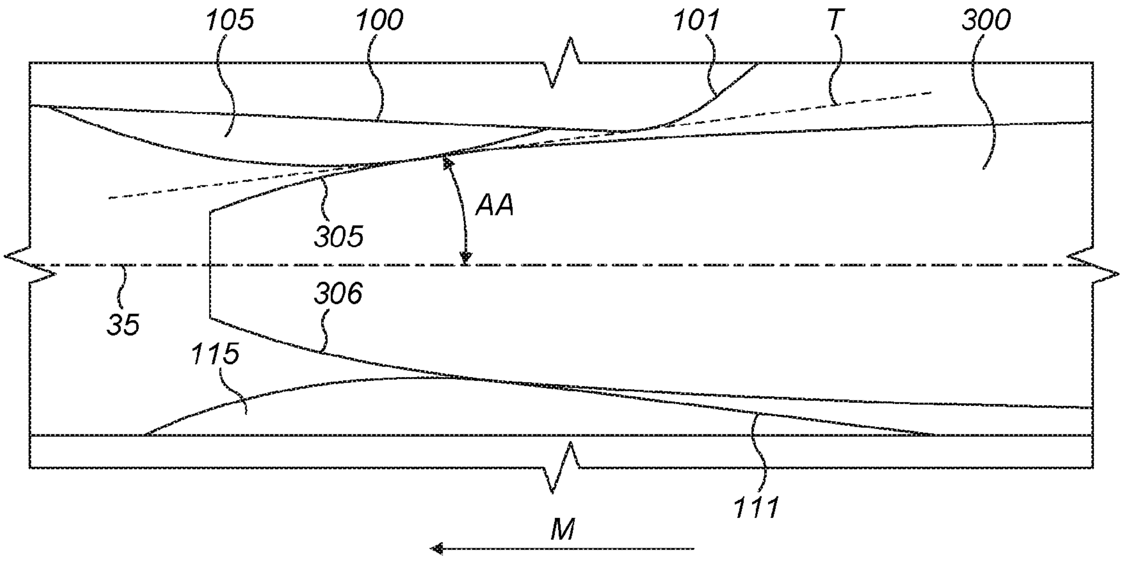
FIG. 9B is a schematic sectional view of a male blade terminal being inserted into a female receptacle terminal in a second position.

FIGS. 9A and 9B schematically illustrate the interaction between the outer surfaces 305, 306 of the male blade terminal 300 and the contact surfaces 103, 113 of the female receptacle terminal 10 as the male blade terminal 300 is inserted therein. Although the mating interaction is described with reference to the arrangement in FIGS. 3 to 6, it will be understood that the male blade terminal 300 interacts with the female receptacle terminal of FIG. 7 in substantially the same way. As the male blade terminal 300 is inserted into the opening 20 of the receptacle, its outer surfaces 305, 306 contact the corresponding contact surfaces 103, 113 of the female terminal. As clearly shown in FIGS. 9A and 9B, the height of the gap between the contact bumps 105, 115 is too small to allow the full height of the male blade terminal 300 to fit therethrough. While the stationary beam 110 remains fixed in place against the lower section 22 of the receptacle, the normal force exerted by the male blade terminal 300 on the resilient contact beam 100 causes the latter to deflect upward with respect to its equilibrium position. The deflection of the resilient contact beam 100 is gradually increased as the male blade terminal 300 is inserted further into the receptacle. The contact surfaces 103, 113 exert a force on the blade surfaces 305, 306, the force being a normal force perpendicular to the interface between each pair of contacting surfaces.

As illustrated in FIG. 9A and described above, the contact surface or surfaces of the female receptacle terminal can include a guide portion which is linear and horizontal (in a plane perpendicular to the insertion direction) in the width direction, and a contact bump which is curved in both the width direction and the insertion direction. Also, the male blade terminal has a substantially rectangular cross section with sloping surfaces, and it can be inserted into a receptacle such that the outer surfaces thereof have a similar shape in the width direction to that of the guide portion. Therefore, when a surface, e.g., the top surface 305, comes into contact with the guide portion 101 of the contact beam 100, a contact interface between them will be linear because they are both linear in the width direction and parallel to the bottom part of the receptacle in a plane perpendicular to the insertion direction. In other words, the male blade terminal will engage the contact surface 103 along a linear contact interface. This initially distributes the normal force along a line, instead of concentrating the force at a single point. The same is true for the guide portion 111 of the stationary beam 110. Therefore, in the illustrated arrangement, this line contact is established when the upper surface 305 engages the guide portion 101 of the resilient contact beam 100, and when the lower surface 306 engages the guide portion 111 of the stationary beam 110 provided on the bottom part of the receptacle.

As illustrated in FIG. 9B and described earlier, a contact bump on one or both of the contact surfaces 103, 113 engages the male blade terminal 300 after the guide portion. The contact bump is curved in both the width direction and in the insertion direction, which can provide a convex outer surface shape with respect to the receptacle. Therefore, when a surface, e.g., the top surface 305, comes into contact with the contact bump 105 of the resilient contact beam 100, given the linear shape of the outer surfaces 305, 306 of the male blade terminal 300 in the width direction compared to the curved shape of the contact bump 105, a contact interface between them will be a single point. In other words, the male blade terminal 300 will engage the contact surface 103 at a point contact interface. In the same way, the outer surface 306 will engage the contact bump 115 of the stationary beam 110 at a point contact interface.

In some prior arrangements, the first contact between a male blade terminal and the female receptacle terminal occurs at a point contact interface near the end face of the male blade terminal, i.e., where the surface slope is greater. This can cause a higher shear stress on the contact surfaces, leading to an increased pile up of plating material on the male blade terminal, eventually resulting in increased wear and an associated increase in insertion force for subsequent mating operations and/or unpredictable insertion force.

By arranging the female receptacle terminal and male blade terminal according to this disclosure, the normal force is distributed across the surface 305, 306 of the male blade terminal 300 at the point of first contact, thereby reducing the degradation of the contact surfaces. However, at the shallower or flat portions of the male blade terminal (i.e., towards the right of the male blade terminal 300 in FIGS. 9A and 9B), a point contact interface is less detrimental to the plating layer. Furthermore, at the shallower or flat portions it is desirable for the normal force to be exerted through a single point rather than a line because it is at these portions of the male blade terminal that an electrical connection will be made. The increased local pressure exerted on the contact surfaces 305, 306 facilitates an improved electrical connection between the male and female components of the electrical connector. This is especially important when a lubricant is used, as electrons can more easily tunnel through the lubricant layer when the pressure is higher. However, if the normal force is too high at the point contact, then this can lead to increased wear as the male blade terminal is slid further into the receptacle.

FIG. 7 illustrates one way in which the normal force can be controlled. As a male blade terminal is inserted into the opening 20 and contacts the resilient contact beam 200, the resilient contact beam 200 will be deflected upwards. The normal force exerted on the blade terminal will be primarily determined by the stiffness of the mounting portion 200*d*. Eventually, as the male blade terminal is inserted further along the insertion direction M, the resilient contact beam 200 will be deflected upwards to such an extent that its free end will contact the top part. At this point, the resilient contact beam 200 is in contact with the top part of the receptacle at both ends and further upwards deflection will require depressing the beam apex 200*c* upwards between the two ends of the resilient contact beam 200. It will be understood that such deflection will require more force, thereby increasing the normal force exerted on the male blade terminal. By tuning the dimension L3 in FIG. 7, the point at which the increased force is required can be altered accordingly to control the normal force over the course of insertion.

With reference to FIG. 9B, another factor that may determine the degree of wear of the contact interfaces is the attack angle. The attack angle may be defined as the angle between the tangent at the contact interface and the insertion axis 35. At the top surface of the male blade terminal 300 shown in FIG. 9B, the attack angle AA is the angle between a tangent T at the contact interface (between the top surface 305 and the corresponding contact bump 105) and the insertion axis 35. Preferably, the attack angle AA is an acute angle no greater than 20 degrees, preferably no greater than 16 degrees. In the arrangement shown, the attack angle AA is approximately 10 degrees.

Figure 10A:
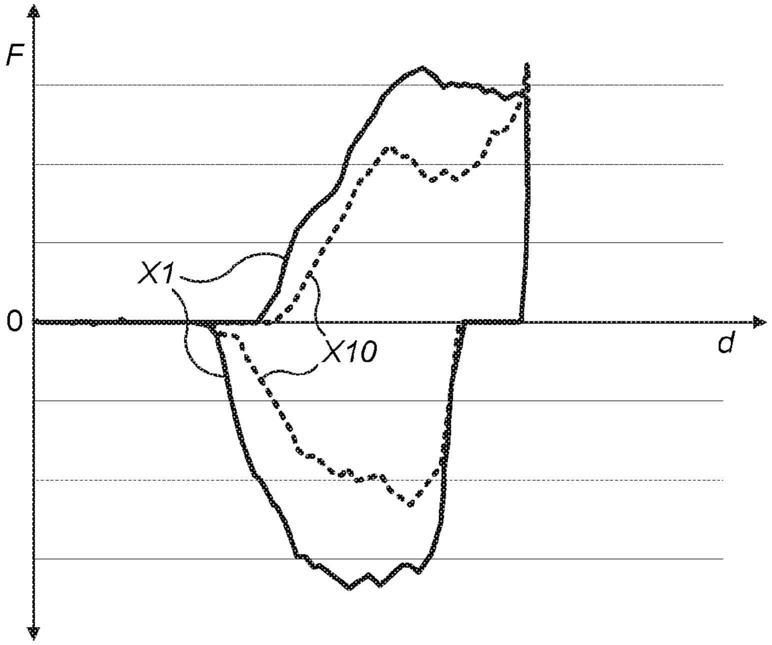
FIG. 10A is a diagram illustrating force against deflection for typical electrical connectors.
Figure 10B:
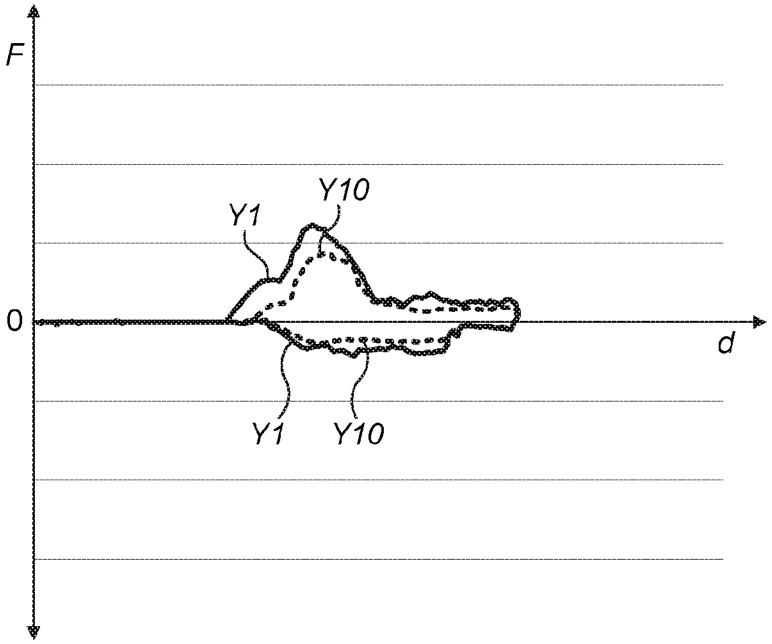
FIG. 10B is a diagram illustrating force against deflection for an electrical connector according to the disclosure.

FIGS. 10A and 10B show graphs of insertion force F against insertion distance d. In other words, these graphs show the amount of force required to insert and remove a given male blade terminal into a female receptacle terminal as a function of how far the male blade terminal is inserted within the female receptacle terminal. FIG. 10A illustrates the force characteristics in a known electrical connector while FIG. 10B illustrates the force characteristics for an electrical connector according to the present disclosure, based on data from experimental measurements. The graphs are plotted on the same scale so that the magnitudes can be directly compared. With respect to the length of a male blade inserted into a receptacle, each graph shows a plot of the force required to insert the blade (shown above the horizontal axis) and a plot of the force required to remove the blade (shown below the horizontal axis), for the first and tenth mate/unmate cycle of a given connector.

In FIG. 10A, plot X1 shows the insertion and removal forces for a first insertion/removal cycle and plot X10 shows the insertion and removal forces for the tenth insertion/removal cycle, of a known connector. In FIG. 10B, plot Y1 shows the insertion and removal forces for a first insertion/removal cycle and plot Y10 shows the insertion and removal forces for the tenth insertion/removal cycle of a connector according to the present disclosure. This shows that as a result of the wear reduction realised by using the presently disclosed electrical connector assembly, the insertion and removals forces are lower than for known connectors for the initial cycle and for the tenth cycle. Furthermore, it can be seen that plots Y1 and Y10 follow substantially the same force profile as each other, while plots X1 and X10 deviate significantly during both insertion and removal. Therefore, in addition to allowing a decreased insertion force, the electrical connector arrangement disclosed herein has a more predictable, consistent and repeatable force profile.

Various modifications, whether by way of addition, deletion and/or substitution, may be made to all of the above described embodiments to provide further embodiments, any and/or all of which are intended to be encompassed by the appended claims.

The invention claimed is:

1. A female receptacle terminal for an electrical connector, the female receptacle terminal comprising:

a receptacle with an insertion axis and a front opening through which a male blade terminal is configured to be received into the receptacle in an insertion direction along the insertion axis;

a resilient contact beam extending from a top part of the receptacle towards an opposed bottom part of the receptacle, the resilient contact beam extending along the insertion axis and having a primary shape comprising a front portion extending towards the bottom part in the insertion direction, a rear portion extending away from the bottom part in the insertion direction, and a beam apex located between the front and rear portions; and at least one contact surface configured to engage with the male blade terminal during insertion of the male blade terminal into the receptacle, the at least one contact surface being provided on the resilient contact beam and comprising:

a contact bump on the rear portion, completely rearward of the beam apex in the insertion direction and projecting into the receptacle in a transverse direction the contact bump having an outer shape which is curved both in the insertion direction and in a width direction of the receptacle; and a guide portion projecting into the receptacle in the transverse direction and having an outer shape which is linear in the width direction and parallel to the bottom part in a plane perpendicular to the insertion direction, the guide portion being positioned adjacent to the contact bump and closer to the opening than the contact bump such that, during insertion of a male blade terminal into the receptacle, the guide portion engages the male blade terminal before the contact bump.

2. The female receptacle terminal according to claim 1, wherein the bump has a bump apex located at least 0.1 mm rearward of the beam apex, preferably at least 0.35 mm rearward of the beam apex.

3. The female receptacle terminal according to claim 1, wherein the beam apex defines a leading edge of the guide portion.

4. The female receptacle terminal according to claim 1, wherein the beam apex has a part-cylindrical outer surface shape with a radius of curvature of at least 0.2 mm to 2 mm.

5. The female receptacle terminal according to claim 1, wherein the outer shape of the contact bump is part-spherical.

6. The female receptacle terminal according to claim 1, wherein the female receptacle terminal comprises:

a body having a connection section for coupling to a conductor and a contacting section for providing an electrical connection to a mating male blade terminal, the contacting section comprising the resilient contact beam; and a covering within which the contacting section of the body is received to define the receptacle of the female receptacle terminal.

7. The female receptacle terminal according to claim 6, wherein the contacting section of the body further comprises a stationary beam which extends in the insertion direction and opposes the resilient contact beam, wherein the stationary beam defines at least part of the bottom part of the receptacle and includes a bottom contact surface.

8. The female receptacle terminal according to claim 1, wherein the at least one contact surface comprises a conductive base material and a plating layer deposited over the conductive base material.

9. The female receptacle terminal according to claim 8, wherein the plating layer is a tin plating layer, a gold plating layer, or a silver plating layer and/or the conductive base material is a copper alloy.

10. The female receptacle terminal according to claim 9, wherein the at least one contact surface further comprises an intermediate layer between the conductive base material and the plating layer, wherein the intermediate layer is formed from nickel or a nickel alloy.

11. An electrical connector comprising:

the female receptacle terminal of claim 1; and a male blade terminal configured to be received in the receptacle.

12. A method of forming an electrical connection comprising providing the female receptacle terminal of claim 1; and inserting the male blade terminal into the receptacle, by engaging the male blade terminal with the contact surface along a linear contact interface and subsequently engaging the male blade terminal with the contact surface.

13. The female receptacle terminal according to claim 1, further comprising a bottom contact surface on the bottom part comprising a ramp and a bottom contact bump having a bump apex, the ramp having a front end adjacent to the bottom part and a rear end adjacent to the bump apex of the bottom contact bump.

14. The female receptacle terminal according to claim 13, wherein an upper surface of the ramp defines a ramp angle in the insertion direction from the front end to the rear end which is substantially constant.

15. The female receptacle terminal according to claim 14, wherein the upper surface of the ramp has a first width at the front end and a second width at the rear end, wherein the first width is greater than the second width, and the ramp tapers linearly from the first width to the second width.

16. The female receptacle terminal according to claim 14, wherein the ramp angle is no greater than 20 degrees relative to the insertion axis.

17. The female receptacle terminal according to claim 13, wherein the ramp is contiguous with the bottom contact bump.

18. The female receptacle terminal according to claim 13, wherein the outer shape of the bottom contact bump is part-spherical.

19. A female receptacle terminal for an electrical connector, the female receptacle terminal comprising:

a receptacle with an insertion axis and a front opening through which a male blade terminal is configured to be received into the receptacle in an insertion direction along the insertion axis;

a resilient contact beam extending from a top part of the receptacle towards an opposed bottom part of the receptacle; and a bottom contact surface on the bottom part configured to engage with the male blade terminal during insertion of the male blade terminal into the receptacle, the bottom contact surface comprising:

a contact bump projecting into the receptacle in a transverse direction and having an outer shape which is curved both in the insertion direction and in a width direction of the receptacle; and a guide portion projecting into the receptacle in the transverse direction and having an outer shape which is linear in the width direction and parallel to the bottom part in a plane perpendicular to the insertion direction, the guide portion being positioned adjacent to the contact bump and closer to the opening than the contact bump such that, during insertion of a male blade terminal into the receptacle, the guide portion engages the male blade terminal before the contact bump.

20. The female receptacle terminal according to claim 19, wherein the guide portion comprises a ramp having a front end adjacent to the bottom part and a rear end adjacent to a bump apex of the contact bump.

21. The female receptacle terminal according to claim 20, wherein an upper surface of the ramp defines a ramp angle in the insertion direction from the front end to the rear end which is substantially constant.

22. The female receptacle terminal according to claim 21, wherein the upper surface of the ramp has a first width at the front end and a second width at the rear end, wherein the first width is greater than the second width.

23. The female receptacle terminal according to claim 22, wherein the upper surface of the ramp is tapered linearly from the first width to the second width.

24. The female receptacle terminal according to claim 22, wherein the first width extends across at least 40 percent of a width of the bottom part, preferably at least 50 percent of the width of the bottom part.

25. The female receptacle terminal according to claim 21, wherein the ramp angle is no greater than 20 degrees relative to the insertion axis.

26. The female receptacle terminal according to claim 20, wherein the ramp is contiguous with the contact bump.

27. The female receptacle terminal according to claim 26, wherein the ramp intersects a front region of the contact bump at an intersection boundary at which the contact bump has a first gradient in the insertion direction and the ramp has a second gradient in the insertion direction, wherein the first and second gradients are substantially the same.

28. An electrical connector comprising:

the female receptacle terminal of claim 19; and a male blade terminal configured to be received in the receptacle.

29. A method of forming an electrical connection comprising:

providing the female receptacle terminal of claim 19; and inserting the male blade terminal into the receptacle by engaging the male blade terminal with the contact surface along a linear contact interface and subsequently engaging the male blade terminal with the contact surface.

30. The female receptacle terminal according to claim 19, wherein the contact bump has an outer shape which is part-spherical.

31. The female receptacle terminal according to claim 19, wherein the resilient contact beam includes a contact surface configured to engage with the male blade terminal during insertion of the male blade terminal into the receptacle, the contact surface on the resilient contact beam comprising:

a top contact bump projecting into the receptacle in a transverse direction, the contact bump having an outer shape which is curved both in the insertion direction and in a width direction of the receptacle; and a top guide portion projecting into the receptacle in the transverse direction and having an outer shape which is linear in the width direction and parallel to the bottom part in a plane perpendicular to the insertion direction, the guide portion being positioned adjacent to the contact bump and closer to the opening than the contact bump such that, during insertion of a male blade terminal into the receptacle, the guide portion engages the male blade terminal before the contact bump.

32. The female receptacle terminal according to claim 20, wherein the contact bump has an outer shape which is part-spherical.

33. A female receptacle terminal for an electrical connector, the female receptacle terminal comprising:

a body having a connection section for coupling to a conductor and a contacting section for providing an electrical connection to a mating male blade terminal, the body forming a receptacle with an insertion axis and an opening configured to receive a male blade terminal into the receptacle in an insertion direction along the insertion axis, the contacting section comprising a resilient contact beam extending from a top part of the receptacle towards an opposed bottom part of the receptacle and a stationary beam extending in the insertion direction and opposes the resilient contact beam;

a covering within which the contacting section of the body is received to define the receptacle of the female receptacle terminal; and a contact surface on the stationary beam, the contact surface being configured to be engaged with the male blade terminal during insertion of the male blade terminal into the receptacle, the contact surface comprises:

a contact bump projecting into the receptacle in a transverse direction and having an outer shape which is curved both in the insertion direction and in a width direction of the receptacle; and a guide portion projecting into the receptacle in the transverse direction and having an outer shape which is linear in the width direction and parallel to the bottom part in a plane perpendicular to the insertion direction, the guide portion being positioned adjacent to the contact bump and closer to the opening than the contact bump such that, during insertion of a male blade terminal into the receptacle, the guide portion engages the male blade terminal before the contact bump.

34. A method of forming an electrical connection comprising:

providing the female receptacle terminal of claim 33; and inserting the male blade terminal into the receptacle by engaging the male blade terminal with the contact surface along a linear contact interface and subsequently engaging the male blade terminal with the contact surface.

* * * * *